Figure 1:
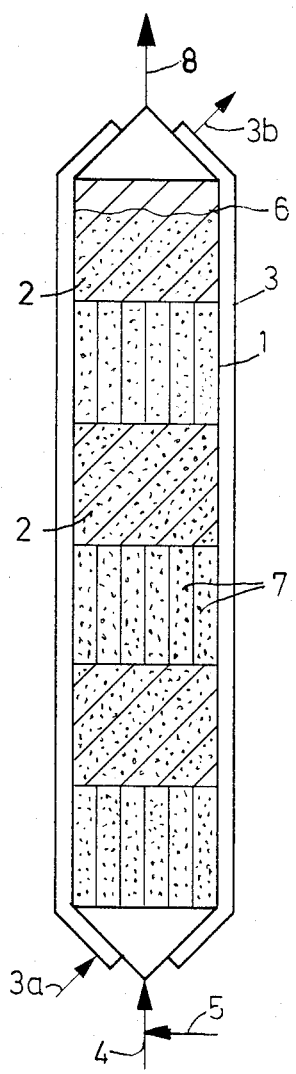

United States Patent [19]

Flaschel et al.

[11] Patent Number: 4,493,735
[45] Date of Patent: Jan. 15, 1985

[54] DEVICE AND METHOD FOR FORMING A FLUIDIZED BED

[75] Inventors: Erwin Flaschel, Chavannes-Renens; Albert Renken, St-Sulpice, both of Switzerland

[73] Assignee: Sulzer Brothers Limited, Winterthur, Switzerland

[21] Appl. No.: 397,434

[22] Filed: Jul. 12, 1982

[30] Foreign Application Priority Data

Jul. 17, 1981 [CH] Switzerland ............... 4707/81

[51] Int. Cl.³ .................. B01J 8/20; B01J 8/34
[52] U.S. Cl. .................. 134/25.1; 422/140; 422/142
[58] Field of Search ............ 422/140, 142; 134/25.1; 138/38, 4 L; 165/109 J; 366/337

[56] References Cited

U.S. PATENT DOCUMENTS

| | | | |
|---|---|---|---|
| 2,425,098 | 8/1947 | Kassel | 422/140 X |
| 3,785,620 | 1/1974 | Huber | 261/103 X |
| 3,980,439 | 9/1976 | Mayer | 422/142 |
| 4,211,277 | 7/1980 | Grosz-Roll et al. | 165/109 T |
| 4,304,753 | 12/1981 | Klaren | 422/140 |

Primary Examiner—Barry S. Richman
Assistant Examiner—William R. Johnson
Attorney, Agent, or Firm—Kenyon & Kenyon

[57] ABSTRACT

A device for liquid-solid fluidized beds comprises a reactor in which a number of static mixing elements are disposed in superposed relation. A device of this kind, which is preferably used for chemical reactions, ensures high concentrations of solid and stable operation of the liquid-solid fluidized bed and has good radial exchange properties and reduced backmixing.

7 Claims, 2 Drawing Figures

DEVICE AND METHOD FOR FORMING A FLUIDIZED BED

This invention relates to a device and method for forming a fluidized bed and particularly a liquid-solid fluidized bed.

The term "liquid-solid fluidized bed" means a fluidized bed in which a liquid forms the continuous phase and in which gases can be dispersed as well as solids.

As is known, the use of liquid-solid fluidized beds is of great importance in process engineering, particularly in chemical reaction technology. Examples are adsorption, crystallization, dissolving of solids and ion exchange, as described e.g. in the article "Mass Transfer to Power Fluids in Fluidized Beds of Large Particles" by S. Kumar and S. N. Upadhyay in "Letters in Heat and Mass Transfer" 7 (1980), page 199.

Fluidized beds are also used in electrochemical processes, e.g. in separating metals from dilute solutions, such as waste liquors or waste waters (see article "Reaktions- und verfahrenstechnische Aspekte elektrochemischer Fest- und Wirbelbett-Zellen" by G. Kreysa and E. Heitz in "Chem.-Ing.-Tech." 48 (1976), page 852).

As chemical reactors, the fluidized beds are also used for chemical reactions with solid suspended catalysts, e.g., immobilized enzymes (see the article "Use for Sweetzyme in Industrial Continuous Isomerization" by J. Oestergaard and S. L. Knudsen, in "Die Stärke" 28 (1976) 10, page 350 and the article "Experimental Results from a Pilot Plant . . . " by R. W. Coughlin, M. Charles and K. Julkowski in "AICHE Symposium Series" 74 (1978) 172, page 40) and in fermentation operations, e.g., with fixed cells (see article "Suggested Kinetic Model for the Fluidized-Bed Biofilm Reactor" by W. K. Shieh in "Biotechnology and Bioengineering" 22 (1980), page 667).

In the aforementioned processes, the efficiency of the liquid-solid fluidized bed is critically influenced by the residence-time distribution of the liquid and the concentration of solid in the bed. However, a large-scale industrial use of liquid-solid fluidized beds is frequently beset with problems of stability.

Special care must be given to the construction of the oncoming flow tray or plate through which the reactants pass. Generally, specially prepared perforated plates, fixed sand beds, screens and the like are used. Even so, it is impossible to prevent channel formation and undesired recirculation of liquid and solid. As a result, the efficiency of the reactor is lowered and a permanent operation is prevented (see the previously-cited article from "Die Stärke".)

Similar instabilities were reported as early as 1962 in research on liquid-solid fluidized beds [see article "The Longitudinal Dispersion of Liquid in a Fluidised Bed" by H. Kramers, M. D. Westermann, J. H. de Groot, F. A. A. Dupont in "Interaction between Fluids and Particles" (London: Inst. Chem. Engrs.) (1962), page 114].

Reproducible results in a fluidized bed 6 meters or 12 meters high and 25.7 and 35.3 millimeters (mm) in diameter were obtained only by using an exactly vertical assembly and avoiding any disturbance to the system, e.g., flanges. In spite of these precautions, inhomogeneities were observed in the reactor, e.g., the distribution of solids was not constant along the entire length.

The previously-mentioned difficulties become worse when the diameter of the reactor increases and the velocity of the liquid decreases.

The liquid, however, has to be given a low linear velocity if a high concentration of solids is required, e.g., a high catalyst concentration, if small particles have to be used, and if the difference in density between liquid and solid is small.

In order to reduce axial dispersion in liquid-solid fluidized beds, it has already been proposed to place tensioned metal springs in parallel in the reactor (see the article "Axial Dispersion of Liquids in Fluidized Beds-/Effect of Internals" by A. B. Burli, P. R. Senthilnathan and N. Subramanian in "The Canadian Journal of Chem. Eng." Vol. 57, October 1979, page 648). The parallel tensioned springs divide the reaction chamber, producing an observed reduction in backmixing. The reduction in axial dispersion of liquid is apparently due to an increase in uniformity of the velocity profile, since the parallel tensioned springs act like bundles of tubes to force the stream of fluid in the axial direction. However, this increases the difficulty of transverse mixing and, consequently, of balancing-out local inhomogeneities. This may result, inter alia, in undesired radial concentration and temperature profiles, particularly in strongly exothermic or endothermic processes. Further, the tensioned springs have a very small effect on the concentration of the solids in the fluidized bed.

Accordingly, it is an object of the invention to effect a more efficient liquid-solid fluidized bed than heretofore provided.

It is another object of the invention to operate a liquid-solid fluidized bed in a stable manner while obtaining a high concentration of solids.

It is another object of the invention to obtain good radial exchange properties with low backmixing in a fluidized bed.

Briefly, the invention provides a device for a liquid-solid fluidized bed which involves a plurality of static mixing elements for stabilizing a flow.

As is known, homogenization in static mixing units is brought about by fixed internals using the flow energy of the constituents to be mixed (liquid-liquid, gas-gas, liquid-gas). (See the article "Statische Mischer und ihre Anwendung" by M. H. Pahl and E. Muschelknautz in "Chem.-Ing.-Tech." 52 (1980) 4, page 285). Further, static mixing units homogeneously distribute the constituents and ensure that the residence time of the constituents is uniform. This increases the efficiency of static mixing units used as chemical reactors.

The invention is based on the discovery that these positive properties are also retained in systems comprising liquids in which a solid is suspended, i.e., fluidized beds.

It has also been found, contrary to all expectations, that at a given linear flow velocity the content of solids can be considerably increased. Operation is also possible under conditions which would result in complete discharge of the solid in a normal fluidized bed.

As a result, in heterogeneous catalyst reactors, the catalyst concentration can be increased and/or the catalyst particles can be given a smaller diameter, resulting in a larger specific outer surface and a lower internal diffusion resistance. Both factors help to increase the reactor efficiency and improve the selectivity in complex reactions.

The transverse mixing brought about by using static mixing elements also stabilizes the liquid-solid fluidized bed, so that no increased demands need be made on an oncoming flow tray or the construction of the device in which the bed is formed. The distribution of solid is homogeneous and the behaviour of the liquid/solid fluidized bed is reproducible.

Operation is basically the same if the liquid-solid fluidized bed is operated in counter-current flow or if a gas is supplied as a third phase.

A number of static mixing units which can be used to obtain the aforementioned effects are described in the previously-cited publication ("Chem.-Ing.-Tech." 52 (1980)). Mixing elements of the types described in German OS No. 29 43 688 (U.K. Pat. No. 2,061,746) and U.S. Pat. No. 3,785,620 have been found particularly suitable.

Figure 2:
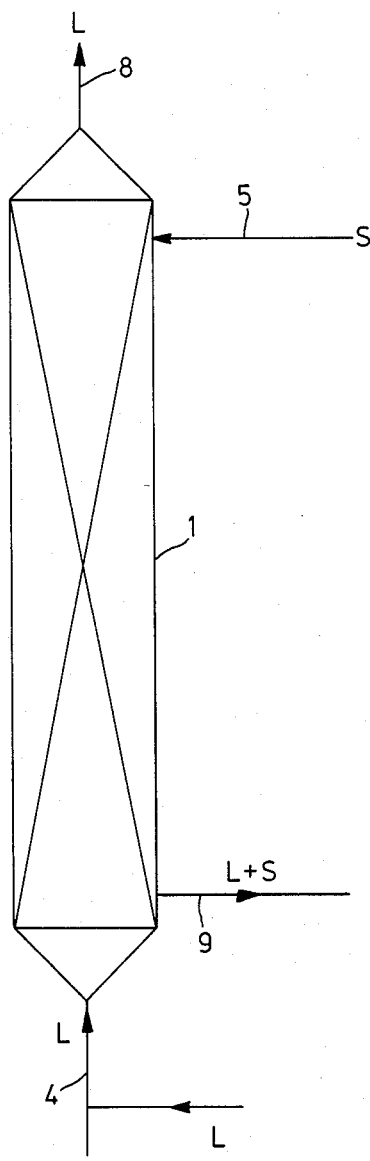

These and other objects and advantages of the invention will become more apparent from the following detailed description taken in conjunction with the accompanying drawing wherein:

FIG. 1 diagrammatically illustrates a longitudinal view of a device constructed in accordance with the invention; and FIG. 2 diagrammatically illustrates a countercurrent system in accordance with the invention.

Referring to FIG. 1, the device for forming a liquid-solid fluidized bed includes a reactor in the form of a tubular jacket 1 which is disposed on a vertical longitudinal axis to define a chamber for the fluidized bed and a plurality (e.g., six) of superposed static mixing elements 2 for stabilizing a flow. Each of the mixing elements 2 is fixedly disposed in the chamber and is rotated relative to the next through an angle, preferably 90° around the jacket axis.

The reactor 1 is surrounded by a double jacket 3 in which a heating or cooling agent (i.e. a heat exchange agent) is supplied through a pipe 3a and withdrawn through a pipe 3b as required by the reaction.

Each mixing element 2 may be of the type as described in the German OS No. 29 43 688 (hereinafter denoted "I"). This type comprises a number of flat layers in contact and parallel to the axis of the jacket 1 and inserted so as to fill the cross-section. Each flat layer comprises straight flow channels extending substantially at an angle to the longitudinal direction of the jacket 1 and the flow channels in each layer extend substantially in the same direction, at least in groups. The flow channels in each two adjacent layers intersect and are at least partly opened to one another at the places of intersection.

Alternatively, each mixing element 2 may be of the type (hereinafter type II) as described in U.S. Pat. No. 3,785,620. This type comprises intersecting webs at an angle to the tube axis. The webs of the static mixing elements are disposed in at least two groups with the webs in each group being disposed substantially parallel. The webs of one group also intersect the webs of the other group.

In addition, a pipe 4 is connected to the reactor 1 to continuously deliver a flowable medium, i.e., a liquid, to the reactor chamber while a second pipe 5 is connected to pipe 4 to deliver a flowable medium, i.e. formed of solid particles 7, to the reactor chamber. The flowable media are delivered at a rate sufficient to form a fluidized bed in the reactor chamber which extends up to a level 6. A discharge pipe 8 is connected to the top of the reactor 1 to continuously discharge the liquid from the reactor chamber.

Each of the mixing elements 2 serves to transversely mix the delivered media together to obtain a homogeneous distribution of the media.

In order to form a fluidized bed, the two flowable media are directed into the reactor chamber at a rate sufficient to form a fluidized bed while being passed through the mixing elements for transversely mixing the media during passage through the fluidized bed.

Various numerical examples of the structure and operation of the reactor 1 will now be given.

EXAMPLE 1

Use was made of a liquid-solid fluidized bed in a tube 2800 millimeters (mm) long and 40 millimeters (mm) internal diameter without and with type I mixing elements. The liquid had a dynamic viscosity of $5.75 \times 10^{-3}$ Pa s (Paschal second) and a density of about 1 gram per cubic centimeter ($g/cm^3$). The solid had an average particle diameter of 0.14 millimeters (mm) and an apparent density of 1.47 grams per cubic centimeter ($g/cm^3$). The particles were irregularly shaped and porous.

At a throughput of 3 kilograms per hour (kg/h), the content of solid was 32% without type I mixing elements and 44% with type I mixing elements. At a throughput of 14 kilograms per hour (kg/h) the content of solid was 7% and 21%, respectively. The maximum content of solid without a flow of liquid (fixed bed) was 53%.

The operating range of the fluidized bed without mixing elements was up to a throughput of 20 kilograms per hours (kg/h), after which the solid was discharged. By contrast, the operating range with type I mixing elements extended up to a throughput of 42 kilograms per hour (kg/h).

EXAMPLE 2

The device used was as in Example 1, but the mixing elements introduced into the solid/liquid fluidized bed were type II. The resulting content of solid was 44% at a fluid throughput of 3 kilograms per hour (kg/h) and 25% at 14 kilograms per hour (kg/h). The operating range of the fluidized bed was extendable to a throughput of 65 kilograms per hour (kg/h), i.e. 3.25 times that of a conventional fluidized bed.

EXAMPLE 3

The efficiency of a chemical reactor is closely dependent on the degree of backmixing in the continuous phase. Accordingly, measurements of axial dispersion were made in the described device. The measurements were made by determining the residence time distribution of an indicator at two places 1590 millimeters (mm) apart.

In order to calculate the parameter characterizing axial dispersion, i.e. $Bo = u_o . L/D_{ax}$, the conventional dispersion model for open systems was used, in which:

Bo = Bodenstein number (—)
$D_{ax}$ = axial dispersion coefficient ($m^2/s$)
$u_o$ = linear flow velocity (m/s) and
L = the length of the measuring section (m)

The following tabulated results were obtained in dependence on the content of solid in the fluidized bed, with and without mixing elements:

| Content of Solids [%] | 40 | 30 | 20 | 10 |
|---|---|---|---|---|
| Fluidized bed without | Bo < 1 | 2.8 | 5.8 | 11.1 |

| Content of Solids [%] | 40 | 30 | 20 | 10 |
|---|---|---|---|---|
| mixing elements | | | | |
| Fluidized bed with type II mixing elements | Bo = 4.7 | 14.4 | 28.0 | 51.3 |
| Fluidized bed with type I mixing elements | Bo = 7.2 | 17.5 | 32.1 | 57.1 |

As shown by the figures in the Table, when mixing elements are used, the Bodenstein number considerably greater and, consequently, the degree of backmixing is considerably smaller.

EXAMPLE 4

A device as in Example 1 was used. The reactor was used without and with type I mixing elements. A liquid and a gas, via a frit, were simultaneously supplied via the pipe 4. The solid was similar to that in Example 1. The liquid had a dynamic viscosity of $10^{-2}$ Pa s and a density of about 1 g/cm$^3$.

The content of solid in the reactor without mixing elements, was 39% at a throughput of 1.2 kilograms per hour (kg/h) liquid which dropped to 35% when gas at 4 liters per hour was supplied simultaneously.

When the reactor contained mixing elements, the 39% content of solids was achieved at a liquid throughput of 2 kilograms per hour (kg/h). When 4 liters per hour (l/h) of gas was added, the content fell to 34%.

Referring to FIG. 2, wherein like reference characters indicate like parts as above, the device may be constructed for counter-current flow. To this end, a liquid is supplied to the reactor 1 via the pipe 4 while the solid particles are delivered via the pipe 5 located at the upper end of the reactor 1. The discharge pipe 8 at the top of the reactor discharges the liquid while the liquid and solid particles can be discharged at a lower end through a pipe 9.

What is claimed is:

1. A method of forming a fluidized bed of solid particles in a reactor having superposed static mixing elements, each element with parallel flow channels extending at an angle to a longitudinal direction of the reactor and with successive mixing elements being rotated through an angle around the reactor therein, said method comprising the steps of
    introducing an amount of solid particles and feeding continuously at least one flowable medium into the reactor at a rate sufficient to form a stable fluidized bed of the solid particles and flowable medium within the static mixing elements;
    passing the solid particles and flowable medium through the superposed static mixing elements to obtain a transverse mixing of the solid particles and flowable medium; and
    taking off the flowable medium at the top of the reactor.

2. A method of forming a stable fluidized bed of solid particles in a reactor having superposed static mixing elements, each mixing element including a plurality of flat layers in contact and parallel to a longitudinal axis of the reactor and inserted to fill the cross-section of the reactor, each flat layer comprising straight flow channels extending substantially at an angle to the longitudinal direction of the reactor with the flow channels in each layer extending substantially in said direction, at least in groups, and the flow channels in each two adjacent layers intersecting and being at least partly opened to one another at places of intersection and successive mixing elements being rotated through an angle around said axis therein, said method comprising the steps of
    introducing an amount of solid particles and feeding continuously at least one flowable medium into the reactor at a rate sufficient to form a stable fluidized bed of the solid particles and flowable medium within the static mixing elements;
    passing the solid particles and flowable medium through the superposed static mixing elements to obtain a transverse mixing of the solid particles and flowable medium; and
    taking off the flowable medium at the top of the reactor.

3. A method as set forth in claim 2 wherein the flowable medium is a liquid.

4. A method as set forth in claim 2 which further comprises the step of additionally directing a flow of gas into the stable fluidized bed.

5. A method as set forth in claim 2 wherein the solid particles and flowable medium are introduced into a bottom of the reactor for con-current flow.

6. A method as set forth in claim 2 wherein the solid particles and flowable medium are introduced into the reactor counter-current flow.

7. A method of forming a fluidized bed of solid particles in a reactor having superposed static mixing elements, each said mixing element including a plurality of intersecting webs disposed at an angle to a longitudinal axis of the jacket, the webs being disposed in at least two groups with the webs in each group being disposed substantially parallel, the webs of one group intersecting the webs of the other group and successive mixing elements being rotated relative to one another by an angle around said axis therein, said method comprising the steps of
    introducing an amount of solid particles and feeding continuously at least one flowable medium into the reactor at a rate sufficient to form a stable fluidized bed of the solid particles and flowable medium within the static mixing elements;
    passing the solid particles and flowable medium through the superposed static mixing elements to obtain a transverse mixing of the solid particles and flowable medium; and
    taking off the flowable medium at the top of the reactor.

* * * * *